United States Patent [19]
Ohta

[11] Patent Number: 6,128,271
[45] Date of Patent: Oct. 3, 2000

[54] OPTICAL RECORDING MEDIUM

[75] Inventor: Minemasa Ohta, Yamanashi-ken, Japan

[73] Assignees: Pioneer Electronic Corporation, Tokyo; Pioneer Video Corporation, Yamanashi-ken, both of Japan

[21] Appl. No.: 09/175,536

[22] Filed: Oct. 20, 1998

[30] Foreign Application Priority Data

Oct. 23, 1997 [JP] Japan ..................................... 9-309208

[51] Int. Cl.⁷ ...................................................... G11B 7/24
[52] U.S. Cl. ...................................................... 369/275.4
[58] Field of Search ........................... 369/275.4, 275.1, 369/275.3, 277, 279, 283, 100, 118, 109, 13, 47–48, 58–59, 54, 112, 44.26

[56] References Cited

U.S. PATENT DOCUMENTS 5,481,530  1/1996  Ueda et al. ........................... 369/275.1
6,021,109  2/2000  Spruit .................................... 369/275.1

*Primary Examiner*—Ali Neyzari
*Attorney, Agent, or Firm*—Arent Fox Kintner Plotkin & Kahn, PLLC

[57] ABSTRACT

An optical recording medium comprises a substrate layer formed with a plurality of grooves having a pitch of 0.7–0.9 μm, further with a plurality of prepits located between the grooves and separated from each other at a predetermined interval; a recording layer formed on the substrate layer. The optical recording medium is adapted for recording and reproducing information by directing a laser beam (having a wavelength of 600–700 nm) through an objective lens (having an numerical aperture of 0.55–0.70), further through the substrate layer so as to converge the beam on the recording layer. In particular, the plurality of grooves are different from the plurality of prepits in depth and/or width.

5 Claims, 1 Drawing Sheet

OPTICAL RECORDING MEDIUM

BACKGROUND OF THE INVENTION

The present invention relates to an optical recording medium, particularly to an optical recording medium capable of recording and reproducing information with a high density by virtue of a laser beam having a short wavelength.

For recording and reproducing information with a high density, there have been developed some new optical recording mediums capable of recording and reproducing information with the use of a laser beam having a wavelength shorter than 780 nm. Such optical recording mediums each comprises a substrate layer and a recording layer formed on the substrate layer. The substrate layer is formed with a plurality of grooves and has a plurality of prepits (containing address information) formed and arranged circumferentially at a predetermined interval between the grooves.

Further, for information recording and reproducing with a high density, sufficient research has been made on a relationship between the shapes of the grooves, prepits and a laser beam having a wavelength near 780 nm. However, there still have not been any sufficient research on how to contract a track pitch and how to converge a short wavelength laser beam in order for an optical recording medium to record and reproduce information with a high density.

Usually, an optical recording medium is adapted to record information by forming a plurality of small recording areas, making use of an optical characteristic variation on a recording layer. However, if a track pitch is contracted from a conventional size (1.6 μm) to a smaller size (1 μm or lower) in order to effect a high density recording and reproducing, there will occur a problem of cross talk. Further, the shapes of grooves and prepits formed in accordance with a conventional designing, when used for high density information recording and reproducing, will bring some undesirable influences to the quality of signals reproduced from the small recording areas.

SUMMARY OF THE INVENTION

It is an object of the present invention to provide an improved optical recording medium capable of recording and reproducing information with a high density and capable of providing a good balance among the signals reproduced from grooves, prepits and small recording areas, so as to solve the above-mentioned problems peculiar to the above-mentioned prior art.

According to the present invention, there is provided an optical recording medium which comprises a substrate layer formed with a plurality of grooves having a pitch of 0.7–0.9 μm, further with a plurality of prepits located between the grooves and separated from each other at a predetermined interval; a recording layer formed on the substrate layer, The optical recording medium is adapted for recording and reproducing information by directing a laser beam (having a wavelength of 600–700 nm) through an objective lens (having an numerical aperture of 0.55–0.70), further through the substrate layer so as to converge the beam on the recording layer. In particular, the plurality of grooves are different from the plurality of prepits in depth and/or width.

In one aspect of the present invention, the plurality of grooves are wobble grooves wobbled in a radial direction of the recording medium.

In another aspect of the present invention, information may be recorded on the above grooves and/or areas between the grooves.

In a further aspect of the present invention, the recording layer contains an organic coloring matter, if a laser beam has a wavelength λ, the substrate layer has an index of refraction n, a pitch between every two adjacent grooves is P, then the width of each groove is P/2±P/4, the depth of each groove is λ/(4n)–λ/(2n).

In a still further aspect of the present invention, the recording layer contains a phase-changable material, if a laser beam has a wavelength λ, the substrate layer has an index of refraction n, a pitch between every two adjacent grooves is P, then the width of each groove is P/2±P/4, the depth of each groove is λ/(32n)–λ/(8n).

The above objects and features of the present invention will become better understood from the following description with reference to the accompanying drawings.

DETAILED DESCRIPTION OF THE PREFERRED EMBODIMENTS

An optical recording medium of the present invention has a substrate layer and a recording layer formed on the substrate layer. The substrate layer is formed with a plurality of grooves having a groove pitch of 0.7–0.9 μm, further has a plurality of prepits formed between the grooves and separated from each other at a predetermined interval. The optical recording medium thus formed, is adapted to record information by forming small recording areas and to reproduce information from the small recording areas, by virtue of a laser beam having a wavelength of 600–700 nm and passing through an objective lens having an NA (numerical aperture) of 0.55–0.70. This laser beam is directed to pass through the above substrate layer and is then converged on the recording layer to irradiate information areas on the grooves and information areas between the grooves.

For use as the substrate layer, it is possible to employ a polycarbonate, a polymethacrylate, a polyolefine. In more detail, the plurality of grooves can be wobble grooves (for use in tracking servo) formed on the substrate layer, and between the wobble grooves there are formed a plurality of prepits (separated from each other at a predetermined interval) containing address information. Such grooves are formed so that each of them has a U-shaped or V-shaped cross section.

In particular, the grooves or wobble grooves are different from prepits in depth or width. Preferably, the grooves or wobble grooves have a different depth and a different width from those of the prepits. It has been found that the use of such structure allows a good balance among three kinds of signals reproduced from grooves, prepits, and small recording areas.

Figure 1:
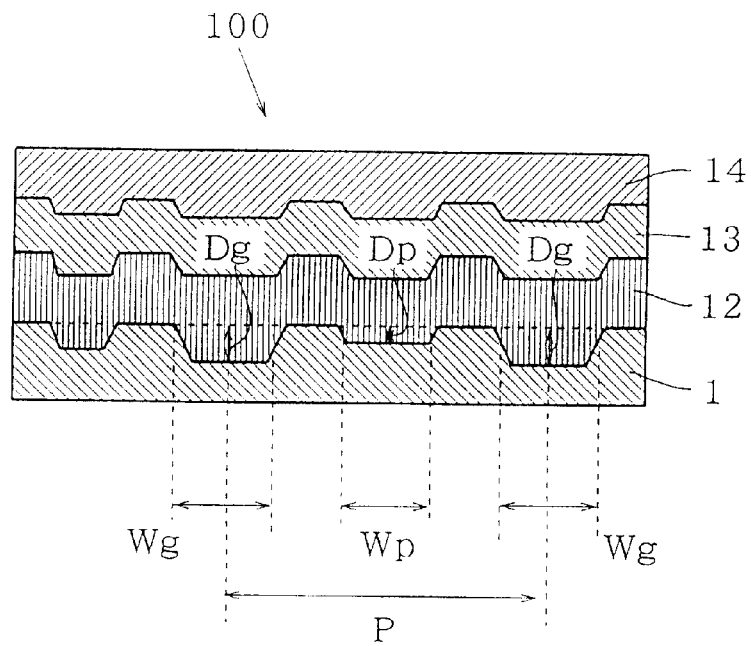
FIG. 1 is a cross sectional view showing a part of an optical recording medium made according to a first embodiment of the present invention.

An optical recording medium made according to a first embodiment of the present invention is illustrated in FIG. 1.

Referring to FIG. 1, an optical recording medium 100 includes a substrate layer 1 formed with a plurality of grooves and prepits, a recording layer 12 containing an organic coloring matter such as an azo pigment, a reflecting layer 13 and a protection layer 14. In particular, the recording layer 12 is made of an azo pigment having a thickness so formed that a reflected light coming from the reflecting layer 13 and passing through the recording layer 12 will have a reflectance of 15–90%. In more detail, the recording layer 12 is formed by coating the substrate layer 1 with a solution such as ethanol in which the azo pigment has been dissolved, with the use of a method called spin coating.

The reflecting layer 13 is preferred to be formed by a gold film or a silver film, since they do not cause any deterioration in the reflectance of a reflected light if a laser beam has a wavelength of 600–700 nm.

The protection layer 14 is preferred to be formed by a ultraviolet-setting resin, having a thickness of 5–20 $\mu$m.

In the present embodiment, a plurality of grooves are formed in a manner such that each of them has a U-shaped or V-shaped cross section and that a pitch P between two grooves is 0.7–0.9 $\mu$m, a depth Dg of each groove is $\lambda/(4n)$–$\lambda/(2n)$, a width Wg of each groove is P/2±P/4. Further, provided that a predetermined signal level is obtainable, each prepit is formed to have a depth Dp that is shallower than that of each groove and has a width Wp that is larger than that of each groove, or alternatively, each prepit is formed to have a depth Dp that is deeper than that of each groove and has a width Wp that is narrower than that of each groove. In this way, it has been found possible to obtain a good balance among three kinds of signals reproduced from grooves, prepits, and small recording areas.

Further, it has been proved by the inventor's experiments that if each groove has a depth shallower than $\lambda/(4n)$, it will be difficult to obtain a sufficient tracking error signal and a sufficient depth of modulation. On the other hand, if each groove has a depth deeper than $\lambda/(2n)$, it will be difficult to obtain sufficient recording and reproducing characteristics. In addition, when each groove has a width larger than 3P/4 or smaller than P/4, there will be a problem of causing a jitter.

If a prepit has a width Wp larger than that of a groove and has a depth equal to that of a groove, a signal reproduced from the prepit will undesirably have a high signal level, hence bringing about an unfavourable influence to the quality of a signal reproduced from small recording areas. Accordingly, if each prepit is formed to have a depth Dp that is shallower than that of each groove and has a width Wp that is larger than that of each groove, or alternatively, each prepit is formed to have a depth Dp that is deeper than that of each groove and has a width Wp that is narrower than that of each groove, it is sure to enable a signal reproduced from the prepits to have an appropriate signal level.

Figure 2:
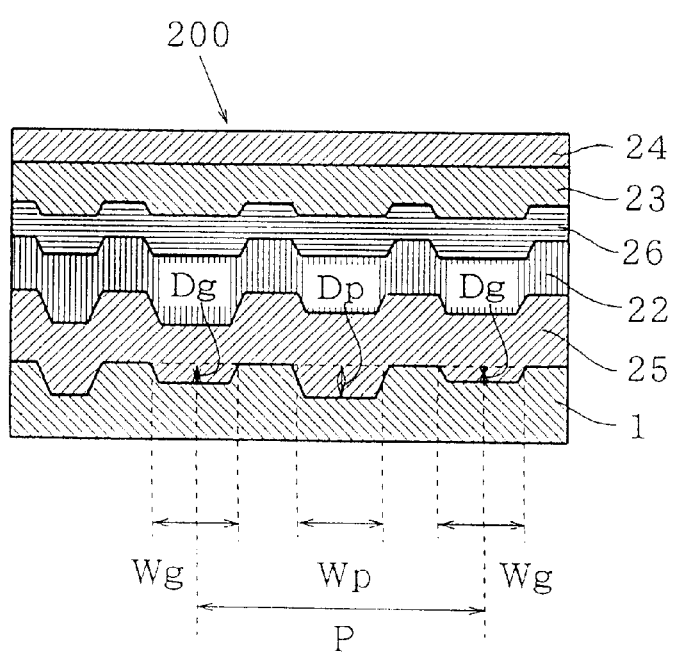
FIG. 2 is a cross sectional view showing a part of an optical recording medium made according to a second embodiment of the present invention.

An optical recording medium made according to a second embodiment of the present invention is illustrated in FIG. 2.

Referring to FIG. 2, an optical recording medium 200 includes a substrate layer 1 formed with a plurality of grooves and prepits, a first dielectric layer 25, a recording layer 22, a second dielectric layer 26, a reflecting layer 23 and a protection layer 24. In particular, the recording layer 22 is made of a phase-changable material such as a In—Ag—Te—Sb material or a Te—Ge—Sb material, and is formed by sputterring either of the materials to the substrate layer 1.

Each of the first and second dielectric layers 25, 26 is made of a mixture containing $SiO_2$ and ZnS, and is formed by sputterring the mixture on to the substrate layer 1. The reflecting layer 23 is preferred to be formed by an Al alloy containing Ti. The protection layer 24 is preferred to be made of an ultraviolet-setting resin, having a thickness of 5–20 $\mu$m.

To ensure a desired reflectance, the first dielectric layer 25 is preferred to have a thickness of 90–180 nm. To ensure a desired recording characteristic and to prevent jitter phenomenon, the recording layer is preferred to have a thickness of 15–25 nm. To ensure a desired sensitivity and a desired recording characteristic, the second dielectric layer 26 is preferred to have a thickness of 15–25 nm.

In the present embodiment, a plurality of grooves are formed in a manner such that each of them has a U-shaped or V-shaped cross section and that a pitch P between two grooves is 0.7–0.9 $\mu$m, a depth Dg of each groove is $\lambda/(32n)$–$\lambda/(8n)$, a width Wg of each groove is P/2±P/4. Further, provided that a predetermined signal level can be obtained, each prepit is formed to have a depth Dp that is shallower than that of each groove and has a width Wp that is larger than that of each groove, or alternatively, each prepit is formed to have a depth Dp that is deeper than that of each groove and has a width Wp that is narrower than that of each groove. In this way, it has been found possible to obtain a good balance among three kinds of signals reproduced from grooves, prepits, and small recording areas.

Further, it has been proved by the inventor's experiments that if each groove has a depth shallower than $\lambda/(32n)$, it will be difficult to obtain a sufficient tracking error signal and a sufficient depth of modulation. On the other hand, if each groove has a depth deeper than $\lambda/(8n)$, it will be difficult to obtain sufficient reflectance. In addition, when each groove has a width larger than 3P/4 or smaller than P/4, there will be a problem that a jitter occurs.

If a prepit has a width Wp larger than that of a groove and has a depth equal to that of a groove, a signal reproduced from the prepit will undesirably have a high signal level, hence bringing about an unfavourable influence to the quality of a signal reproduced from small recording areas. Accordingly, if each prepit is formed to have a depth Dp that is shallower than that of each groove and has a width Wp that is larger than that of each groove, or alternatively, each prepit is formed to have a depth Dp that is deeper than that of each groove and has a width Wp that is narrower than that of each groove, it is sure to enable a signal reproduced from the prepits to have an appropriate signal level.

With the use of the present invention, since the grooves or wobble grooves are different from the prepits in depth and/or width, it has become possible to provide an improved optical recording medium which can have a good balance among three kinds of signals reproduced from grooves, prepits, and small recording areas, thereby enabling the recording medium to record information with a high density.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical recording medium, comprising:
   a substrate layer formed with a plurality of grooves having a pitch of 0.7–0.9 $\mu$m, further with a plurality of prepits located between the grooves and separated from each other at a predetermined interval;
   a recording layer formed on the substrate layer;
   wherein the optical recording medium is adapted for recording and reproducing information by directing a laser beam having a wavelength of 600–700 nm, through an objective lens having an numerical aperture of 0.55–700, further through the substrate layer so as to converge the beam on the recording layer;
   characterized in that: the plurality of grooves are different from the plurality of prepits in depth and/or width.

2. The optical recording medium according to claim 1, wherein the plurality of grooves are wobble grooves wobbled in a radial direction of the recording medium.

3. The optical recording medium according to claim 1, wherein information may be recorded on the above grooves and/or areas between the grooves.

4. The optical recording medium according to claim 1, wherein the recording layer contains an organic coloring matter, if a laser beam has a wavelength $\lambda$, the substrate layer has an index of refraction n, a pitch between every two adjacent grooves is P, then the width of each groove is $P/2 \pm P/4$, the depth of each groove is $\lambda/(4n) - \lambda/(2n)$.

5. The optical recording medium according to claim 1, wherein the recording layer contains a phase-changable material, if a laser beam has a wavelength $\lambda$, the substrate layer has an index of refraction n, a pitch between every two adjacent grooves is P, then the width of each groove is $P/2 \pm P/4$, the depth of each groove is $\lambda/(32n) - \lambda/(8n)$.

* * * * *